(12) United States Patent
Kamei et al.

(10) Patent No.: US 9,128,644 B2
(45) Date of Patent: Sep. 8, 2015

(54) IMAGE PROCESSING SYSTEM INCLUDING AN IMAGE PROCESSING APPARATUS AND A PORTABLE TERMINAL

(75) Inventors: Nobuo Kamei, Osaka (JP); Tomoyuki Okamoto, Kyoto (JP); Yasuji Takeuchi, Kobe (JP); Takeshi Maekawa, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 815 days.

(21) Appl. No.: 13/271,932

(22) Filed: Oct. 12, 2011

(65) Prior Publication Data

US 2012/0092715 A1 Apr. 19, 2012

(30) Foreign Application Priority Data

Oct. 13, 2010 (JP) .................... 2010-230358

(51) Int. Cl.
*H04N 5/232* (2006.01)
*G06F 3/12* (2006.01)
*G06F 3/0488* (2013.01)
*H04M 1/725* (2006.01)
*H04N 1/00* (2006.01)
*H04N 1/32* (2006.01)

(52) U.S. Cl.
CPC .......... *G06F 3/1204* (2013.01); *G06F 3/04886* (2013.01); *G06F 3/122* (2013.01); *G06F 3/1228* (2013.01); *G06F 3/1268* (2013.01); *G06F 3/1289* (2013.01); *G06F 3/1292* (2013.01); *H04M 1/7253* (2013.01); *H04N 1/00347* (2013.01); *G06F 3/1232* (2013.01); *H04M 2250/10* (2013.01); *H04M 2250/52* (2013.01); *H04N 1/00244* (2013.01); *H04N 1/00408* (2013.01); *H04N 1/32144* (2013.01);
(Continued)

(58) Field of Classification Search
CPC ................................. H04N 5/23293
USPC ..................... 348/207.2; 358/1.15
See application file for complete search history.

(56) References Cited

U.S. PATENT DOCUMENTS 7,516,421 B2   4/2009  Asano et al.
2013/0222672 A1*  8/2013  Kim et al. ............... 348/333.11

FOREIGN PATENT DOCUMENTS

CN     1869593 A    11/2006
JP     2004-48674    2/2004
(Continued)

OTHER PUBLICATIONS

Suzuki et al., "u-Photo: Interacting with Pervasive Services using Digital Still Images," Lecture Notes in Computer Science—LNCS, Springer, DE, vol. 3468, Jan. 1,2005, pp. 190-207.*

(Continued)

*Primary Examiner* — Joel Fosselman
(74) *Attorney, Agent, or Firm* — Osha Liang LLP

(57) ABSTRACT

The position and orientation at a time of shooting by a shooting unit of a portable terminal is transmitted to an information processing apparatus. Based on the transmitted position and orientation of the portable terminal and the stored position of an image processing apparatus, the information processing apparatus extracts an image processing apparatus from the shot image and transmits information about the extracted image processing apparatus to the portable terminal. The portable terminal combines the shot image with an option for selecting a function available in the image processing apparatus and displays the combined image on a display unit, based on the information transmitted from the information processing apparatus. When selection of a function is accepted, a screen for operating the selected function is displayed on the display unit of the portable terminal.

13 Claims, 14 Drawing Sheets

(52) U.S. Cl.
CPC .. *H04N2201/001* (2013.01); *H04N 2201/0055* (2013.01); *H04N 2201/0084* (2013.01); *H04N 2201/0094* (2013.01); *H04N 2201/3245* (2013.01); *H04N 2201/3253* (2013.01); *H04N 2201/3254* (2013.01); *H04N 2201/3273* (2013.01); *H04N 2201/3278* (2013.01)

(56) References Cited

FOREIGN PATENT DOCUMENTS

| | | |
|---|---|---|
| JP | 2006-91390 | 4/2006 |
| JP | 2006-351024 | 12/2006 |
| JP | 2007-318519 | 12/2007 |
| JP | 2010-219879 A | 9/2010 |

OTHER PUBLICATIONS

Office Action issued in counterpart Chinese application No. 201110316268.2 mailed Feb. 27, 2014 (19 pages).

Notice of Grounds of Rejection mailed Jul. 31, 2012, directed to Japanese Patent Application No. 2010-230358; 5 pages.

Office Action issued in counterpart Chinese Patent Application No. 201110316268.2 dated Aug. 12, 2014 (32 pages).

* cited by examiner

FIG.11

| MFP NAME | POSITIONAL INFORMATION | | | COMMUNICATION INFORMATION | | FUNCTIONAL INFORMATION | |
|---|---|---|---|---|---|---|---|
| | LONGITUDE | LATITUDE | ALTITUDE | IP ADDRESS | Bluetooth ADDRESS | BOX FUNCTION | SCAN FUNCTION |
| MFP1 | 135° x1'x1" xxx1 East | 35° y1'y1" yyy1 North | 15m | vv. vv. vv. vv | vv. vv. vv. vv. vv. vv | YES | YES |
| MFP2 | 135° x2'x2" xxx2 East | 35° y2'y2" yyy2 North | 40m | aa. aa. aa. aa | ww. ww. ww. ww. ww. ww | NO | YES |
| MFP3 | 135° x3'x3" xxx3 East | 35° y3'y3" yyy3 North | 5m | bb. bb. bb. bb | xx. xx. xx. xx. xx. xx | YES | NO |
| MFP4 | 135° x4'x4" xxx4 East | 35° y4'y4" yyy4 North | 32m | cc. cc. cc. cc | yy. yy. yy. yy. yy. yy | YES | YES |

IMAGE PROCESSING SYSTEM INCLUDING AN IMAGE PROCESSING APPARATUS AND A PORTABLE TERMINAL

This application is based on Japanese Patent Application No. 2010-230358 filed with the Japan Patent Office on Oct. 13, 2010, the entire content of which is hereby incorporated by reference.

BACKGROUND OF THE INVENTION

1. Field of the Invention

The present invention relates to an image processing system, a control method, an image processing apparatus, a portable terminal, and an information processing apparatus, and more particularly to an image processing system in which an image processing apparatus is operated by a portable terminal, a control method, the image processing apparatus, the portable terminal, and an information processing apparatus.

2. Description of the Related Art

Image processing apparatuses such as copiers, printers, and MFPs (Multi-Functional Peripherals) including those functions are often used in office environments. Many users have opportunities to use those apparatuses.

On the other hand, with the recent widespread use of portable terminals, users carry portable equipment such as mobile phones having a function of connecting to the Internet, a camera function, and a position detection function and are familiar themselves with using them. Then, as disclosed in, for example, Japanese Laid-Open Patent Publication Nos. 2006-351024 and 2006-091390, some portable information terminals obtain information stored beforehand in association with positional information from a server and combine the information with the captured image, thereby allowing users to view information such as facility usage status or reservation information based on the captured image.

As such image processing apparatuses grow more sophisticated, the operations for users to give operation instructions become complicated. Therefore, the users who use the apparatuses less frequently or the users who use different kinds of apparatuses find it difficult to recognize available functions or find it difficult to use the apparatuses due to the complicated operations.

Then, in light of the widespread use of portable terminals as described above, users may desire to use portable terminals familiar to them even when operating image processing apparatuses.

SUMMARY OF THE INVENTION

The present invention is made to solve such a problem. An object of the present invention is to provide an image processing system in which an image processing apparatus can be operated easily using a portable terminal, a control method, the image processing apparatus, the portable terminal, and an information processing apparatus.

In order to achieve the object, in accordance with an aspect of the present invention, an image processing system includes a portable terminal, an image processing apparatus including a controller, and an information processing apparatus. The portable terminal includes a shooting unit, an obtaining unit for obtaining positional information and orientation information of the portable terminal, a display unit, and an input unit for inputting an instruction on an operation screen displayed on the display unit. The information processing apparatus includes a storage unit for storing, as information about an image processing apparatus, positional information of the image processing apparatus, functional information indicating an installed available function, and communication information for communicating with the portable terminal. The portable terminal transmits positional information and orientation information at a time of shooting by the shooting unit to the information processing apparatus. The information processing apparatus detects an image processing apparatus included in an image shot by the shooting unit of the portable terminal, based on the positional information and orientation information at a time of shooting at the portable terminal, and transmits information about the detected image processing apparatus to the portable terminal. The portable terminal further includes a controller for combining the image shot by the shooting unit with an option for selecting an available function in the image processing apparatus and displaying the combined image on the display unit, and for accepting selection of the function by the input unit.

Preferably, when accepting selection of the function, the controller of the portable terminal transmits a signal specifying the function to the image processing apparatus. The controller of the image processing apparatus transmits information for displaying a screen for operating the function to the portable terminal, based on the signal specifying the function. The controller of the portable terminal allows the display unit to display a screen for operating the selected function based on the information.

More preferably, the image processing apparatus further includes a display unit for displaying an operation screen for accepting operation input, and the controller of the image processing apparatus transmits information for an operation screen of the function to be displayed on the display unit of the image processing apparatus, to the portable terminal, based on the signal specifying the selected function from the portable terminal.

Preferably, when accepting an instruction on the operation screen by the input unit, the controller of the portable terminal transmits a signal representing the instruction to the image processing apparatus. The controller of the image processing apparatus executes image processing corresponding to the signal.

Preferably, the image processing apparatus further includes a storage unit for storing, as information about the image processing apparatus, positional information of the image processing apparatus, functional information indicating an available function installed in the image processing apparatus, and communication information for communicating with the portable terminal, a first communication unit for communicating with the information processing apparatus, and a second communication unit for communicating with the portable terminal. When detecting a change of the information about the image processing apparatus, the controller of the image processing apparatus executes a process of transmitting the information about the image processing apparatus to the information processing apparatus.

In accordance with another aspect of the present invention, provided is a control method for an image processing system including a portable terminal having a shooting unit and a display unit, an image processing apparatus, and an information processing apparatus. The information processing apparatus stores, as information about the image processing apparatus, positional information of the image processing apparatus, functional information indicating an installed available function, and communication information for communicating with the portable terminal. The control method includes the steps of: causing the portable terminal to transmit positional information and orientation information at a time of shooting by the shooting unit of the portable terminal to the information processing apparatus; causing the information processing apparatus to extract an image processing apparatus included in an image shot by the shooting unit of the portable terminal, based on the positional information and orientation information transmitted from the portable terminal and the positional information included in the information about the image processing apparatus, and to transmit information about the extracted image processing apparatus to the portable terminal; causing the portable terminal to combine the image shot by the shooting unit with an option for selecting an available function in the image processing apparatus and display the combined image on the display unit, based on the information about the image processing apparatus transmitted from the information processing apparatus; when selection of the function is accepted, causing the portable terminal to display a screen for operating the selected function on the display unit; when an instruction on the screen for operating is accepted, causing the portable terminal to transmit a signal representing the instruction to the image processing apparatus; and causing the image processing apparatus to execute corresponding image processing based on the signal.

Preferably, the control method further includes the steps of: when selection of the function is accepted, causing the portable terminal to transmit a signal specifying the selected function to the image processing apparatus; and causing the image processing apparatus to transmit information for displaying a screen for operating the function to the portable terminal, based on the signal specifying the function that is transmitted from the portable terminal. In the step of causing the portable terminal to display a screen for operating the selected function on the display unit, the portable terminal displays the screen for operating based on the information for displaying a screen for operating the function that is transmitted from the image processing apparatus.

In accordance with a further aspect of the present invention, a portable terminal includes a shooting unit, an obtaining unit for obtaining positional information and orientation information of the portable terminal, a display unit, an input unit for inputting an instruction on an operation screen displayed on the display unit, and a controller. The controller executes a process of transmitting positional information and orientation information at a time of shooting by the shooting unit to an information processing apparatus, a process of combining an image shot by the shooting unit with an option for selecting an available function in an image processing apparatus, and displaying the combined image on the display unit, based on information about the image processing apparatus received from the information processing apparatus, a process of accepting selection of the function by the input unit and then displaying a screen for operating the selected function on the display unit, and a process of accepting an instruction on the screen for operating by the input unit and then transmitting a signal representing the instruction to the image processing apparatus.

Preferably, when accepting selection of the function by the input unit, the controller transmits a signal specifying the function to the image processing apparatus and allows the display unit to display the screen for operating based on information for displaying the screen for operating the function that is received from the image processing apparatus in response to the signal.

In accordance with yet another aspect of the present invention, an information processing apparatus includes: a storage unit for storing, as information about an image processing apparatus, positional information of the image processing apparatus, functional information indicating an installed available function, and communication information for communicating with a portable terminal; a communication unit for communicating with the portable terminal; and a controller. When receiving, from the portable terminal, positional information and orientation information at a time of shooting by a shooting unit of the portable terminal, the controller executes a process of extracting an image processing apparatus included in an image shot by the shooting unit of the portable terminal, based on the positional information and orientation information and the positional information included in the information about the image processing apparatus, and transmitting information about the extracted image processing apparatus to the portable terminal.

In accordance with a still further aspect of the present invention, an image processing apparatus includes: a first communication unit for communicating with a portable terminal; and a controller. Based on a signal specifying a function of image processing received from the portable terminal, the controller executes a process of transmitting information for displaying a screen for operating the function to the portable terminal.

Preferably, the image processing apparatus further includes: a storage unit for storing, as information about the image processing apparatus, positional information of the image processing apparatus, functional information indicating an available function installed in the image processing apparatus, and communication information for communicating with the portable terminal; and a second communication unit for communicating with an information processing apparatus. When detecting a change of the information about the image processing apparatus, the controller further executes a process of transmitting the information about the image processing apparatus to the information processing apparatus.

In accordance with another aspect of the present invention, a non-transitory computer-readable recording medium is encoded with a control program for causing a portable terminal including a shooting unit and a display unit to execute processing. The control program causes the portable terminal to execute the steps of: transmitting positional information and orientation information at a time of shooting by the shooting unit to an information processing apparatus; combining an image shot by the shooting unit with an option for selecting an available function in the image processing apparatus and displaying the combined image on the display unit, based on information about an image processing apparatus that is received from the information processing apparatus; when selection of the function is accepted, displaying a screen for operating the selected function on the display unit; and when an instruction on the screen for operating is accepted, transmitting a signal representing the instruction to the image processing apparatus.

Preferably, the step of displaying a screen for operating the selected function on the display unit includes the steps of: when selection of the function is accepted, transmitting a signal specifying the function to the image processing apparatus; and receiving information for displaying a screen for operating the function from the image processing apparatus in response to the signal. The screen for operating is displayed on the display unit based on the information for displaying a screen for operating the function from the image processing apparatus.

In accordance with yet another aspect of the present invention, a non-transitory computer-readable recording medium is encoded with a control program for causing an information processing apparatus to execute processing. The information processing apparatus stores, as information about an image processing apparatus, positional information of the image processing apparatus, functional information indicating an installed available function, and communication information for communicating with a portable terminal. The control program causes the information processing apparatus to execute the steps of: receiving, from the portable terminal, positional information and orientation information at a time of shooting by a shooting unit of the portable terminal; extracting an image processing apparatus included in an image shot by the shooting unit of the portable terminal, based on the positional information and orientation information and the positional information included in the information about an image processing apparatus; and transmitting information about the extracted image processing apparatus to the portable terminal.

In accordance with yet another aspect of the present invention, a non-transitory computer-readable recording medium is encoded with a control program for causing an image processing apparatus to execute processing. The control program causes the image processing apparatus to execute the steps of: based on a signal specifying a function that is received from a portable terminal, transmitting information for displaying a screen for operating the function to the portable terminal; and executing image processing corresponding to an instruction about image processing from the portable terminal in accordance with the screen.

In accordance with yet another aspect of the present invention, a non-transitory computer-readable recording medium is encoded with a control program for causing an image processing apparatus to execute processing. The image processing apparatus stores, as information about the image processing apparatus, positional information of the image processing apparatus, functional information indicating an available function installed in the image processing apparatus, and communication information for communicating with a portable terminal. The control program causes the image processing apparatus to execute the steps of: detecting a change of the information about the image processing apparatus; and transmitting the information about the image processing apparatus to an information processing apparatus when the change is detected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing a specific example of an MFP list stored in the server.

DESCRIPTION OF THE PREFERRED EMBODIMENTS

Figure 1:
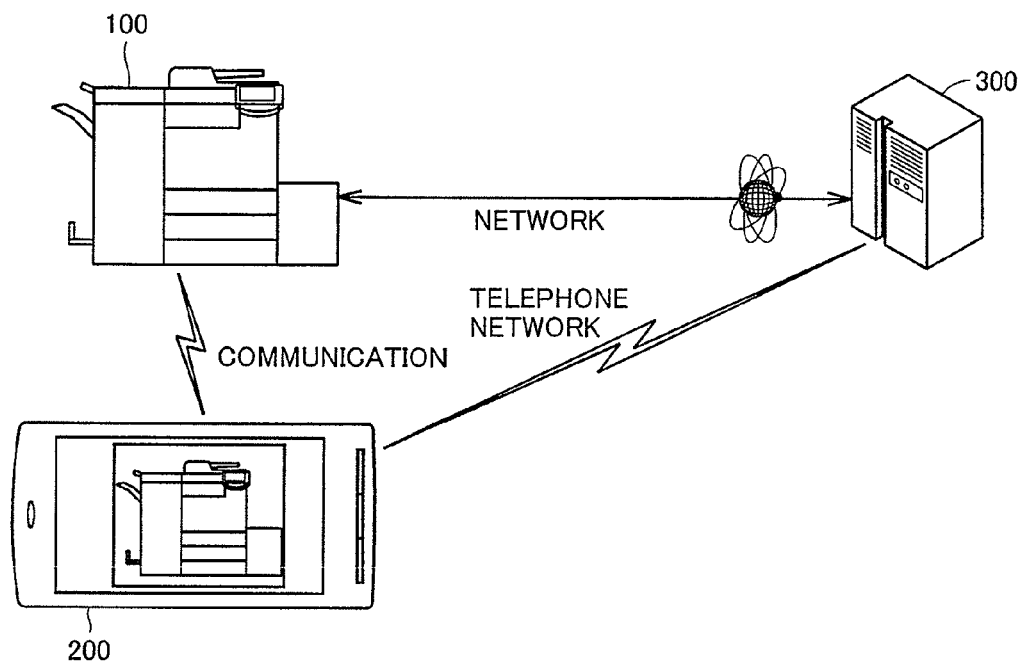
FIG. 1 is a diagram showing a specific example of a configuration of an image processing system according to an embodiment.

In the following, an embodiment of the present invention will be described with reference to the figures. In the following description, the same parts and components are denoted with the same reference numerals. Their names and functions are also the same.

<System Configuration>

FIG. 1 is a diagram showing a specific example of a configuration of an image processing system according to an embodiment.

Referring to FIG. 1, the image processing system according to the present embodiment includes an MFP (Multi-Functional Peripheral) 100 serving as an image processing apparatus, a portable terminal 200, and a server 300.

The image processing apparatus is not limited to an MFP and may be a printer, a facsimile machine, a copier, or any other similar device having at least one or more image processing functions. MFP 100 is an image processing apparatus that combines these functions.

Portable terminal 200 is, for example, a mobile phone or any other device at least having a camera function, an instruction input function, and a communication function.

The server is a general personal computer or any other similar device.

MFP 100 and potable terminal 200 can communicate with each other and exchange information with each other. Any communication system may be employed in the communication between MFP 100 and portable terminal 200 as long as it is wireless communication. In the example below, wireless communication using Bluetooth® is employed. However, any other communication such as infrared communication or short-distance wireless communication may be employed.

MFP 100 and server 300 can also communicate with each other and exchange information with each other. The communication between MFP 100 and server 300 is either wired or wireless, and any communication system may be employed. Since it is assumed that the image processing system according to the present embodiment is used in an office environment, MFP 100 and server 300 are connected to a wired or wireless LAN (Local Area Network) and exchange information through the network, by way of example.

Portable terminal 200 and server 300 can also communicate with each other and exchange information with each other. Any communication system may be employed in the communication between portable terminal 200 and server 300 as long as it is wireless communication. In the example below, wireless communication using a telephone network is employed. However, infrared communication or short-distance wireless communication may be employed. In the case where portable terminal 200 and server 300 are connected to a wireless LAN, information may be exchanged over the network.

In the following description, different communication systems are employed, specifically, wireless communication using Bluetooth® between MFP 100 and portable terminal 200, communication via a LAN between MFP 100 and server 300, and wireless communication using a telephone network between portable terminal 200 and server 300. However, the same communication system such as communication via a LAN may be employed in each communication.

Although the image processing system in FIG. 1 is configured to include one MFP, one portable terminal, and one server, it may at least include more than one MFP and more than one potable terminal.

<Overall Operations>

The overall operations in the image processing system according to the present embodiment mainly include an MFP information registration operation and an operation for operating the MFP.

Here, "MFP information" refers to information about the MFP included in the image processing system, which is registered in server 300, and includes positional information which is information for specifying the position of MFP 100, communication information which is information for communication, and functional information which is information for specifying the installed available function. Specific examples thereof will be described later. Plural pieces of MFP information stored in server 300 may also referred to as an "MFP list" in the following description.

The MFP information registration operation is performed prior to the operation for operating the MFP and refers to an operation of registering information of MFP 100 in server 300 at a prescribed timing or updating the information of MFP 100 stored in server 300 with the latest information.

Figure 2:
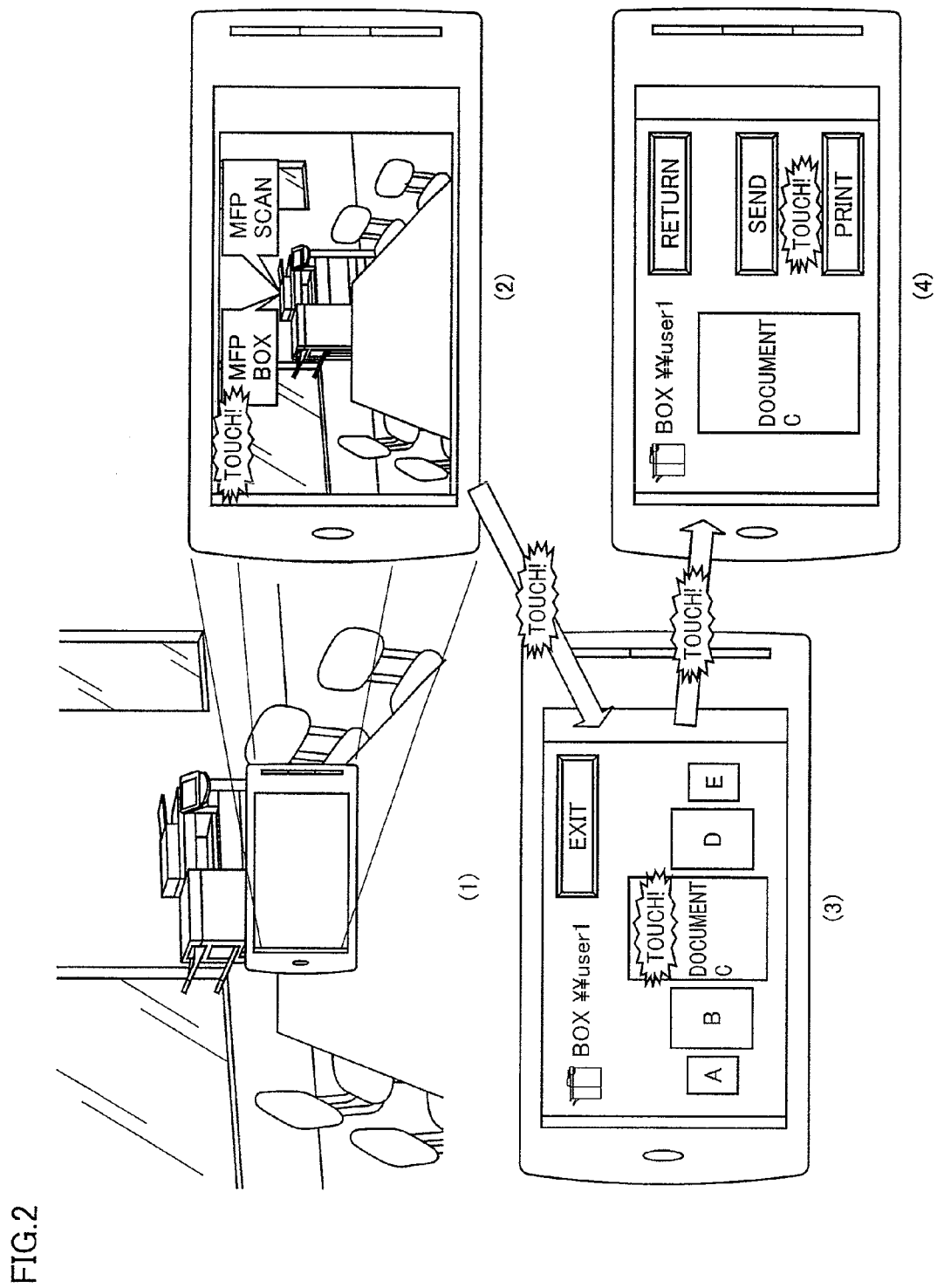
FIG. 2 is a diagram for illustrating overall operations in the image processing system according to the embodiment.

The operation for operating the MFP refers to an operation of performing an operation using portable terminal 200 to allow MFP 100 to execute image processing using a function installed in MFP 100. FIG. 2 is a diagram for illustrating the overall operations in the image processing system according to the embodiment. The operation for operating MFP 100 in the image processing system will be described using FIG. 2.

Referring to FIG. 2, a user carrying portable terminal 200 points portable terminal 200 at MFP 100 serving as an operation target to shoot MFP 100 (FIG. 2 (1)). Then, the shot image of MFP 100 serving as an operation target appears on a display screen of portable terminal 200. The functions available in MFP 100 are selectably displayed in the form of tags superimposed on the shot image (FIG. 2 (2)). The user selects a tag representing a function to use, from those tags.

It is noted that the "tag" here refers to an option displayed on the touch panel, and is labeled with a function to be operated, as illustrated in FIG. 2 (2), and displayed in the vicinity of the image of MFP 100 as an operation target so as to be superimposed on the original image. Touching the tag designates to perform the operation corresponding to the function.

For example, when the user selects (touches) a tag indicating a box function which is a function of processing image data stored in a storage area associated with the user ("touch" in FIG. 2 (2)), the screen display of portable terminal 200 switches to a screen for operating the box function of MFP 100 (FIG. 2 (3)). When image data to be processed is selected on the screen ("touch" in FIG. 2 (3)), the screen display of portable terminal 200 further switches to a screen for selecting a method of processing the image data (FIG. 2 (4)). Then, when a processing method is selected on the screen ("touch" in FIG. 2 (4)), image processing based on the operation is executed in MFP 100.

The configuration of each device for performing these operations will be described below.

<Configuration of MFP>

Figure 3:
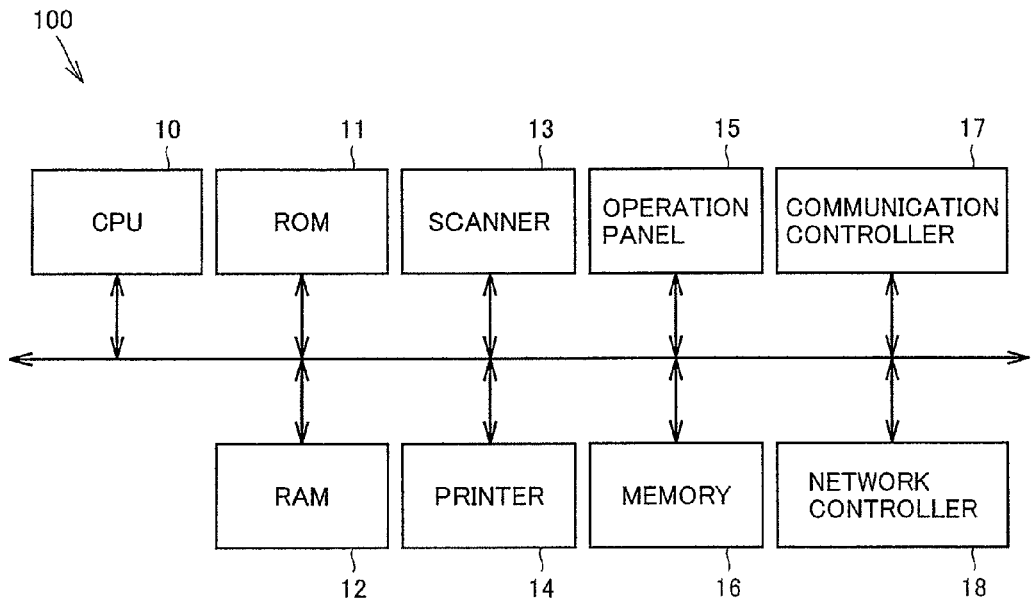
FIG. 3 is a diagram showing a specific example of a hardware configuration of an MFP (Multi-Functional Peripheral) included in the image processing system according to the embodiment.

FIG. 3 shows a specific example of a hardware configuration of MFP 100.

Referring to FIG. 3, MFP 100 includes a CPU (Central Processing Unit) 10 as an arithmetic unit for controlling MFP 100 as a whole, a ROM (Read Only Memory) 11 for storing a program executed in CPU 10, a RAM (Random Access Memory) 12 functioning as a work area for executing a program in CPU 10, a scanner 13 for optically scanning a document placed on a not-shown platen to obtain image data, a printer 14 for fixing image data on print paper, an operation panel 15 including a touch panel for displaying information and accepting an operation input to MFP 100, a memory 16 for storing image data, a communication controller 17 for controlling wireless communication using Bluetooth®, and a network controller 18 for controlling communication via a LAN.

Figure 4:
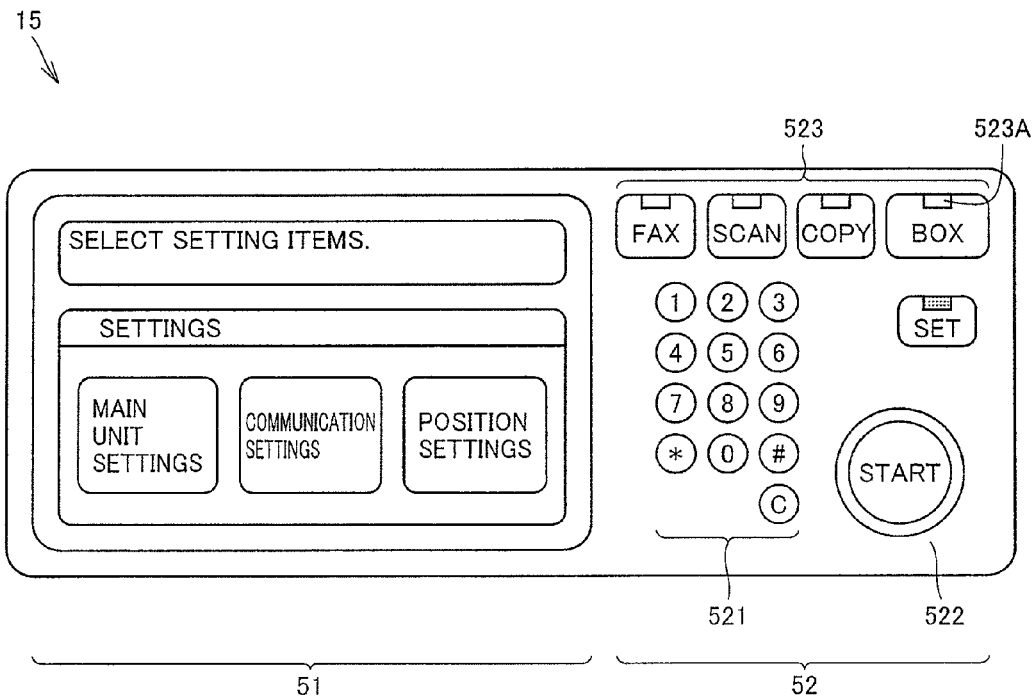
FIG. 4 is a diagram showing a specific example of a configuration of an operation panel of the MFP.

FIG. 4 is a diagram showing a specific example of a configuration of operation panel 15.

Referring to FIG. 4, operation panel 15 includes a touch panel 51 and operation keys 52. Touch panel 51, configured to include a display such as a liquid crystal display and a position designating device such as an optical touch panel or a capacitive touch panel, displays an operation screen and specifies a designated position on the operation screen. CPU 10 allows touch panel 51 to display an operation screen, based on data for allowing image display that is stored beforehand.

Operation keys 52 include a ten-key pad 521, a start key 522 for designating start of a job, and mode select keys 523 for selecting a mode to be activated. Mode select keys 523 each include an indicator lamp 523A containing, for example, an LED (Light Emitting Diode) to indicate being selected.

An operation signal indicating a designated position (touched position) specified on touch panel 51 or a pressed key is input to CPU 10. CPU 10 then specifies an operation content based on the pressed key, or the displayed operation screen and the designated position, and executes a process based on the operation content.

<Configuration of Portable Terminal>

Figure 5:
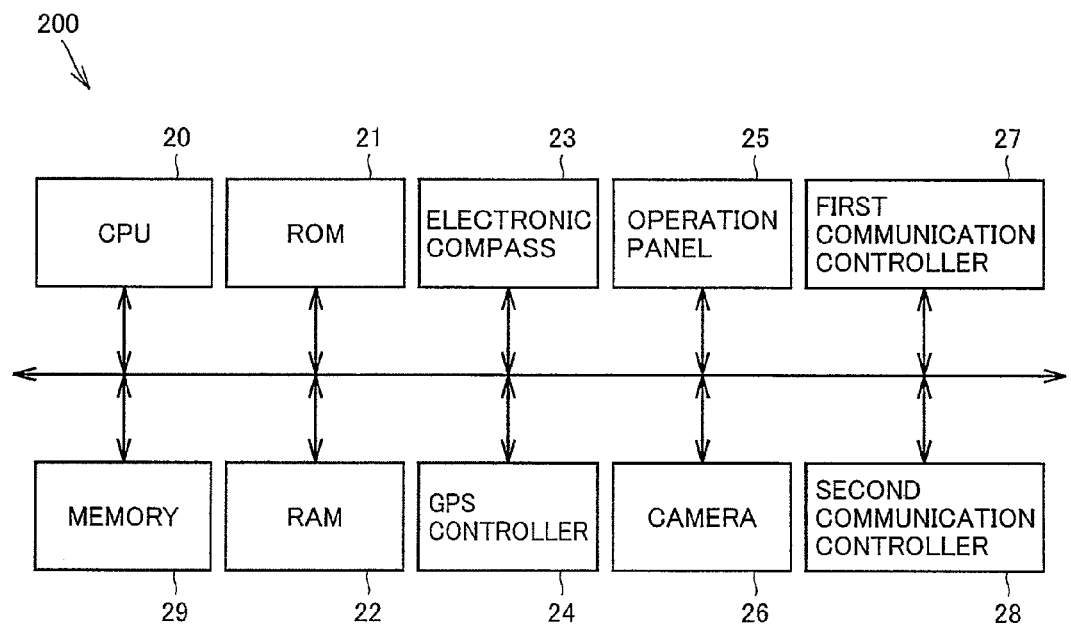
FIG. 5 is a diagram showing a specific example of a hardware configuration of a portable terminal included in the image processing system according to the embodiment.

FIG. 5 is a diagram showing a specific example of a hardware configuration of portable terminal 200.

Referring to FIG. 5, portable terminal 200 includes a CPU 20 as an arithmetic unit for controlling portable terminal 200 as a whole, a ROM 21 for storing a program executed in CPU 20, a RAM 22 functioning as a work area for executing a program in CPU 20, an electronic compass 23 including a magnetic sensor for detecting an orientation of potable terminal 200, a GPS (Global Positioning System) controller 24 receiving a GPS signal or a positional signal from a base station for obtaining positional information of portable terminal 200, an operation panel 25 including a touch panel for displaying information and accepting an operation input to portable terminal 200, a camera 26, a first communication controller 27 for controlling communication via a telephone network through communication with a not-shown base station, a second communication controller 28 for controlling wireless communication using Bluetooth®, and a memory 29 for storing telephone book data and the like.

Operation panel 25 may be configured similar to operation panel 15 of MFP 100. More specifically, it includes, for example, a touch panel formed of a display such as a liquid crystal display and a position designating device such as an optical touch panel or a capacitive touch panel, and operation keys.

CPU 20 allows the touch panel to display an operation screen based on data for allowing screen display that is stored beforehand. A designated position on the operation screen is specified on the touch panel, and an operation signal indicating the designated position is input to CPU 20. An operation signal indicating the pressed key is also input to CPU 20. CPU 20 specifies an operation content based on the pressed key, or the displayed operation screen and the designated position, and executes a process based on the operation content.

Electronic compass 23 and GPS controller 24 output a signal to CPU 20 to indicate the obtained orientation or positional information of potable terminal 200.

<Configuration of Server>

Figure 6:
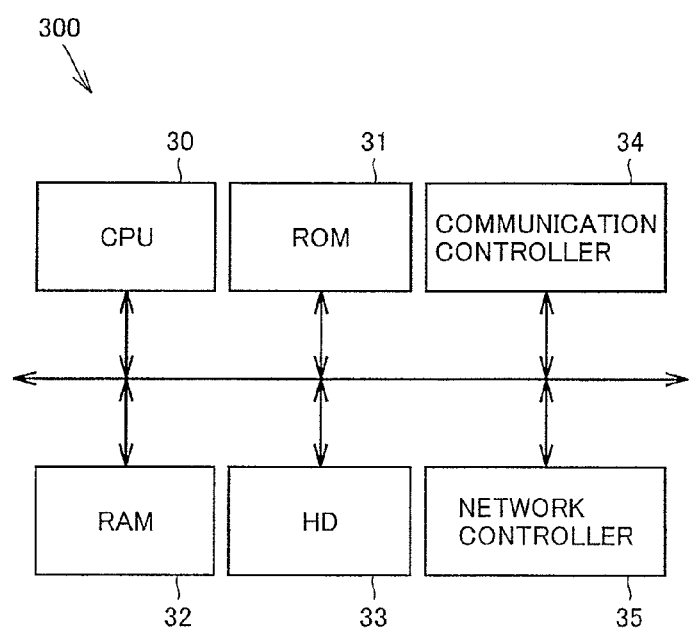
FIG. 6 is a diagram showing a specific example of a hardware configuration of a server included in the image processing system according to the embodiment.

FIG. 6 is a diagram showing a specific example of a hardware configuration of server 300.

Referring to FIG. 6, server 300 is formed, for example, of a general computer as described above. By way of example, server 300 includes a CPU 30 as an arithmetic unit for controlling server 300 as a whole, a ROM 31 for storing a program executed in CPU 30, a RAM 32 functioning as a work area for executing a program in CPU 30, an HD (Hard Disk) 33 for storing MFP information and the like, a communication controller 34 for controlling communication via a telephone network, and a network controller 35 for controlling communication via a LAN.

<Functional Configuration>

The functional configuration of each device for implementing the operation as illustrated in the overall operations in the image processing system will be described.

Figure 7:
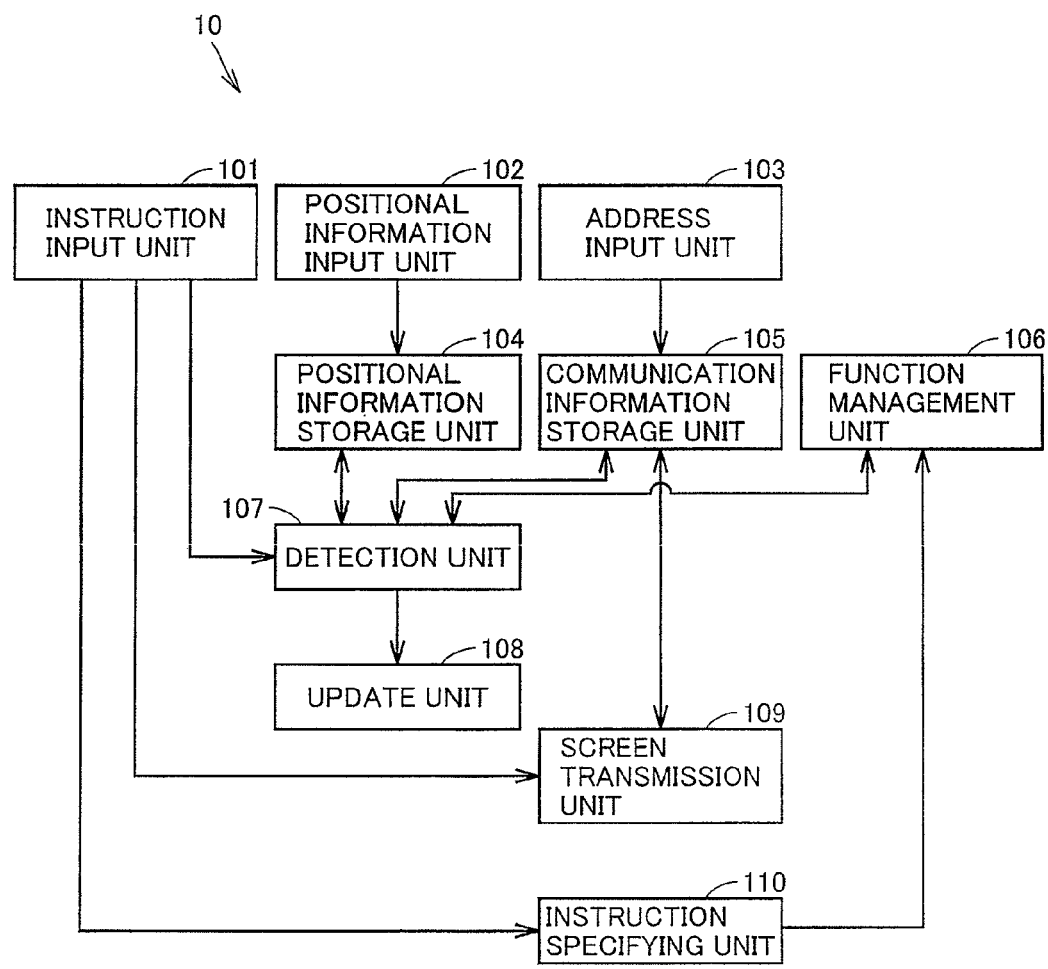
FIG. 7 is a block diagram showing a specific example of a functional configuration of the MFP.

FIG. 7 is a block diagram showing a specific example of a functional configuration of MFP 100. Each function shown in FIG. 7 is a function mainly formed in CPU 10 when CPU 10 reads out a program stored in ROM 11 and executes the program on RAM 12. However, at least part of the functions may be formed by the hardware configuration shown in FIG. 3.

Referring to FIG. 7, as functions for implementing the operations as described above, MFP 100 includes an instruction input unit 101 for accepting an instruction input from operation panel 15 or any other device, a positional information input unit 102 for accepting input of its own positional information from operation panel 15 or from the GPS function not shown in FIG. 3, if any, an address input unit 103 for accepting input of a LAN address and an address in wireless communication using Bluetooth®, a positional information storage unit 104 for storing the positional information accepted by positional information input unit 102, a communication information storage unit 105 for storing the address accepted by address input unit 103, as communication information, a function management unit 106 for managing the functions of MFP 100 and allowing each function to execute an operation, a detection unit 107 for detecting a change of positional information, communication information, and executable functions in MFP 100, an update unit 108 for transmitting the positional information, communication information, and functional information of MFP 100 as MFP information to server 300 to register or update the MFP information in the MFP list in server 300, a screen transmission unit 109 for transmitting required operation screen data among operation screens data stored beforehand, in response to a request from portable terminal 200 as described later, and an instruction specifying unit 110 for specifying the content of an instruction from portable terminal 200.

The method of specifying an instruction content in instruction specifying unit 110 is similar to the method of specifying the instruction content in the case where a touch instruction is accepted in accordance with an operation screen on its own operation panel 15. More specifically, instruction specifying unit 110 specifies where in the operation screen the designated position is located, based on a signal for specifying the designated position from portable terminal 200 and the transmitted screen data, and determines the instruction content corresponding to the specified position with reference to the correspondence stored beforehand between the position on the screen and the instruction content.

Figure 8:
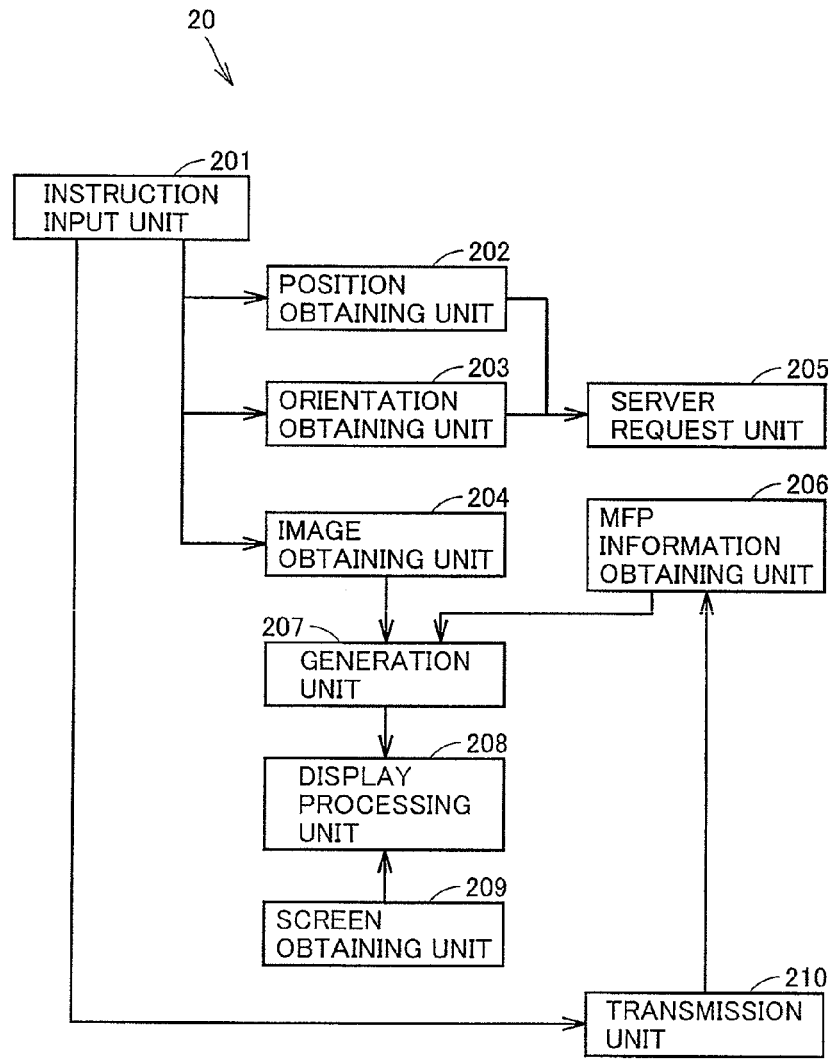
FIG. 8 is a block diagram showing a specific example of a functional configuration of the portable terminal.

FIG. 8 is a block diagram showing a specific example of a functional configuration of portable terminal 200. Each function shown in FIG. 8 is a function mainly formed in CPU 20 when CPU 20 reads out a program stored in ROM 21 and executes the program on RAM 22. However, at least part of the functions may be formed by the hardware configuration shown in FIG. 5.

Referring to FIG. 8, as functions for implementing the operations as described above, portable terminal 200 includes an instruction input unit 201 for accepting an instruction input from operation panel 25, a position obtaining unit 202 for obtaining positional information of portable terminal 200 in response to a shooting instruction from operation panel 25, an orientation obtaining unit 203 for obtaining an orientation of portable terminal 200 in response to a shooting instruction from operation panel 25, an image obtaining unit 204 for obtaining image data captured by shooting by camera 26 in response to a shooting instruction from operation panel 25, a server request unit 205 for requesting the MFP information from server 300 together with the positional information and orientation information obtained in response to a shooting instruction from operation panel 25, an MFP information obtaining unit 206 for obtaining the MFP information of MFP 100 serving as an operation target from server 300 in response to the request, a generation unit 207 for generating screen data by combining selectable tags with image data based on the image data obtained by shooting and the MFP information, a display processing unit 208 for executing a process of displaying screen data on operation panel 25, a transmission unit 210 for transmitting, to MFP 100, an operation signal specifying a designated position on the display screen based on the screen data, and a screen obtaining unit 209 for obtaining screen data transmitted from MFP 100 in response to the signal.

Since positional obtaining unit 202 and orientation obtaining unit 203 obtain positional information and orientation information, respectively, in response to a shooting instruction from operation panel 25, the information thereof can serve as information of a shooting position and information of a shooting direction, respectively. Then, in the description below, the positional information and orientation information transmitted from portable terminal 200 to server 300 in accordance with the program are also referred to as shooting position information and shooting direction information, respectively.

Figure 9:
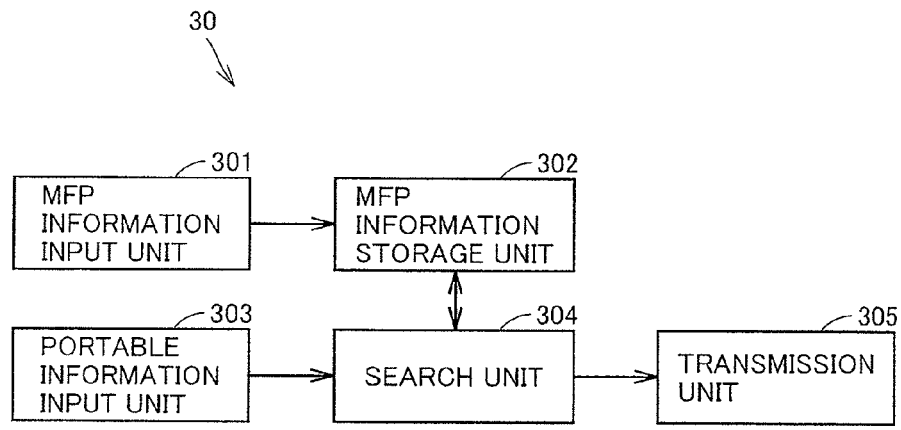
FIG. 9 is a block diagram showing a specific example of a functional configuration of the server.

FIG. 9 is a block diagram showing a specific example of a functional configuration of server 300. Each function shown in FIG. 9 is a function mainly formed in CPU 30 when CPU 30 reads out a program stored in ROM 31 and executes the program on RAM 32. However, at least part of the functions may be formed by the hardware configuration shown in FIG. 6.

Referring to FIG. 9, as functions for implementing the operations as described above, server 300 includes an MFP information input unit 301 for accepting input of MFP information from MFP 100, an MFP information storage unit 302 for storing or updating the MFP information input in the MFP list in a prescribed area of HD 33, a portable information input unit 303 for accepting input of a shooting position and a shooting direction together with a request for MFP information from portable terminal 200, a search unit 304 for searching for the MFP present in the shot image of portable terminal 200 based on the shooting position and the shooting direction of portable terminal 200, and a transmission unit 305 for transmitting the retrieved MFP information of the MFP 100 to portable terminal 200.

<Operation Flow for Registration of MFP Information>

Figure 10:
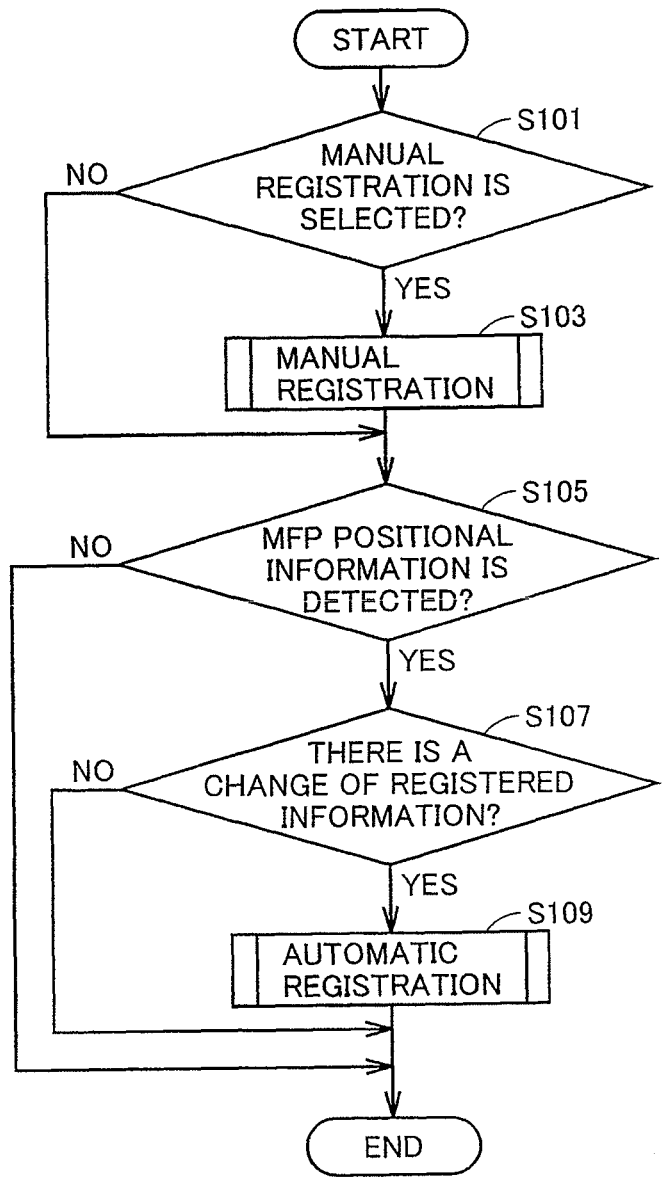
FIG. 10 is a flowchart showing a specific example of an operation in the MFP performing an MFP information registration operation.

FIG. 10 is a flowchart showing a specific example of an operation in MFP 100 performing the MFP information registration operation. The operation shown in the flowchart in FIG. 10 is implemented when CPU 10 reads out a program stored in ROM 11 and executes the program on RAM 12.

Here, the registration of MFP information includes "manual registration" performed by user's operation and "automatic registration" automatically performed without user's operation at a predetermined prescribed timing. Which registration method is employed in registering MFP information is preset in MFP 100, for example, by an administrator. CPU 10 stores the setting.

Referring to FIG. 10, when the "manual registration" is set (YES in step S101), in step S103, CPU 10 executes a predetermined MFP information registration operation in accordance with an operation signal from operation panel 15. Specifically, CPU 10 accepts input of positional information, communication information, and functional information as MFP information in accordance with an operation signal from operation panel 15 and stores the information. Then, the information is transmitted as MFP information to server 300.

On the other hand, when the "automatic registration" is set (NO in step S101), CPU 10 detects positional information, communication information, functional information at the respective prescribed timings. The prescribed timings are, for example, the timing at which MFP 100 is installed, the timing at which network communication is established, or prescribed time intervals. At the instant when the positional information, communication information, or functional information is detected (YES in step S105), CPU 10 compares the detected information with the stored information and determines whether there is a change. If a change is detected (YES in step S107), in step S109, CPU 10 executes a predetermined MFP information registration operation. Specifically, CPU 10 updates the information detected being changed, of the stored positional information, communication information, and functional information, with the latest information and thereafter transmits the MFP information to server 300. Here, only the information that has changed in the MFP information may be transmitted, or the entire MFP information may be transmitted.

Upon receiving the MFP information from MFP 100, server 300 updates the MFP list stored in a prescribed area in HD 33. Specifically, when the MFP information of MFP 100 is not registered in the MFP list, server 300 newly registers the received MFP information. When it has already been registered, server 300 updates the registered MFP information with the received MFP information.

Through this registration operation, the position, address, and installed available functions of each MFP included in the image processing system are registered in server 300.

FIG. 11 is a diagram showing a specific example of the MFP list stored in server 300. Referring to FIG. 11, registered in the MFP list, for each MFP included in the image processing system, are the latitude, longitude, and altitude as positional information, the IP address that is an address for communicating with server 300 and the Bluetooth® address that is an address for communicating with portable terminal 200 as communication information, and presence/absence of the box function and the scan function each as functional information.

The MFP information is not limited to the one shown in FIG. 11. For example, an altitude may not be included in the positional information. In a case where any other communication system is employed, the communication information may be an address according to the communication system. The functional information may include the presence/absence of any other function. In a case where user authentication is performed as described later, whether to permit the use of a function for each user may be included.

In the foregoing description, the MFP information is transmitted from MFP 100 to server 300 for registration or update of the MFP list. Alternatively, in a case where server 300 has an input device, an administrator of the image processing system, for example, may directly input MFP information to server 300. Alternatively, a not-shown communication terminal connected to MFP 100 may transmit MFP information to server 300. In this case, MFP 100 may not be able to communicate with server 300 as long as the communication terminal connected to MFP 100 can communicate with server 300.

<Operation Flow for Operation for Operating MFP>

Figure 12:
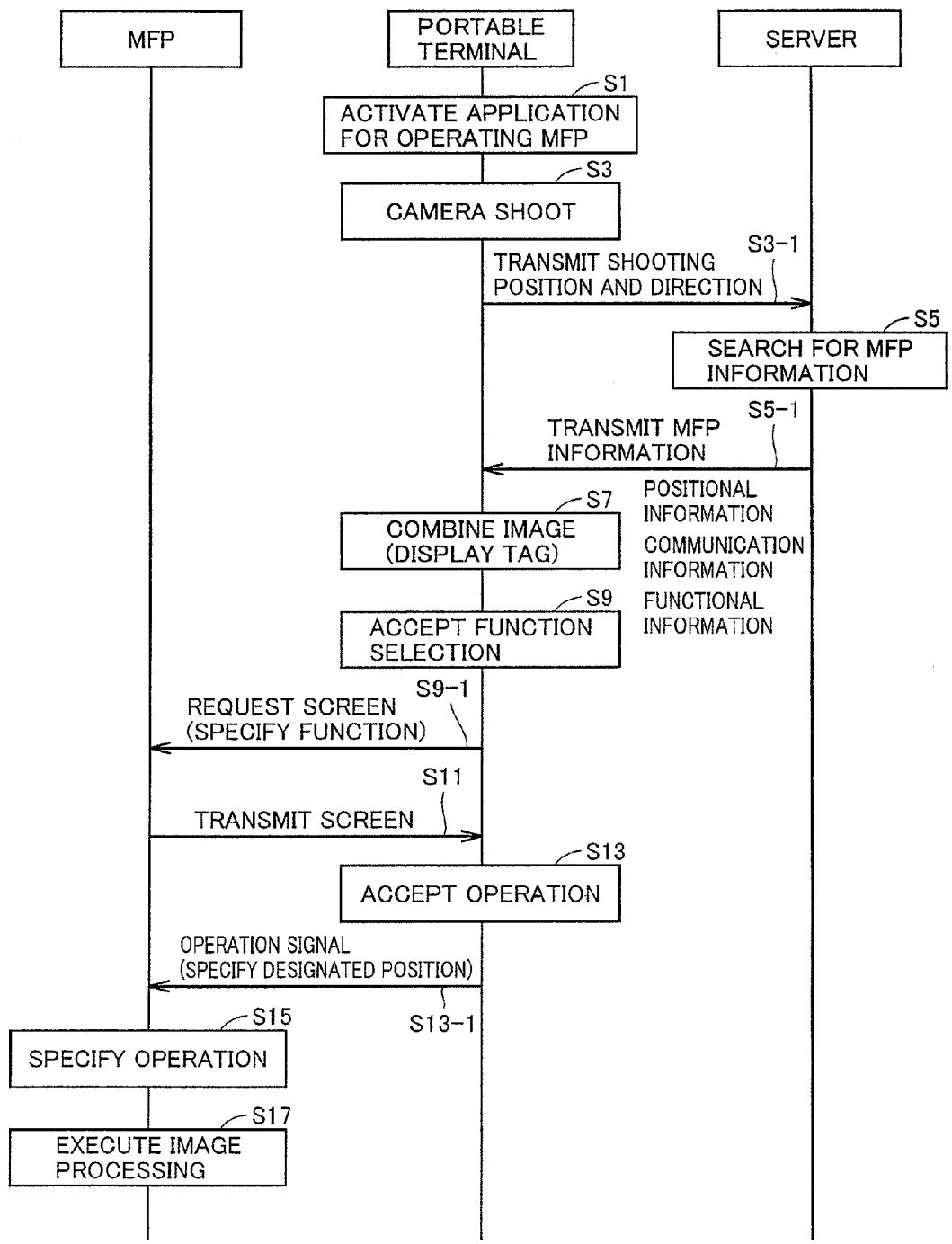
FIG. 12 is a sequence diagram illustrating a flow of an operation for operating the MFP.

FIG. 12 is a sequence diagram illustrating a flow of an operation for operating the MFP. FIG. 12 shows a flow of processing in MFP 100 on the left side, a flow of processing in portable terminal 200 at the middle, and a flow of processing in server 300 on the right side. Each operation is implemented when the CPU of each device reads out a program stored in the ROM and executes the program on the RAM.

Referring to FIG. 12, in a state in which application for MFP operation is being activated in portable terminal 200 (step S1), the camera shoots a photo (step S3), and then the information that specifies a shooting position and a shooting direction at portable terminal 200 is transmitted to server 300, whereby the corresponding MFP information is requested (step S3-1).

Server 300 accepts the request from portable terminal 200 and searches for the MFP information of the MFP located in a prescribed range in the shooting direction from the shooting position from portable terminal 200, with reference to each positional information in the stored MFP list (step S5). Then, the corresponding MFP information is transmitted to portable terminal 200 (step S5-1). At portable terminal 200, the application combines the image data from camera 26 with tags for selecting the functions specified by the functional information included in the received MFP information and displays the combined image on operation panel 25 (step S7).

When the tag is selected (touched) on the image displayed on operation panel 25 of portable terminal 200 (step S9), a request for a screen is given to MFP 100 together with the information that specifies the function corresponding to the selected tag (step S9-1).

MFP 100 transmits screen data for operating a process by the requested function to the requestor portable terminal 200 (step S11). Here, the screen data stored beforehand to be displayed on its own operation panel 15 may be transmitted to portable terminal 200, or the corresponding screen data stored for portable terminal 200 may be transmitted, or if the information specifying portable terminal 200 is transmitted together from the requestor portable terminal 200, the screen data stored beforehand to be displayed on its own operation panel 15 may be transmitted after being subjected to resolution conversion based on the information of portable terminal 200.

Here, the screen data itself is transmitted from MFP 100 to portable terminal 200. However, in a case where the program activated in portable terminal 200 has a function of generating an operation screen, only the information necessary for the operation screen may be transmitted from MFP 100 to portable terminal 200, and screen data may be generated in portable terminal 200 based on the transmitted information.

At portable terminal 200, an operation screen is displayed based on the transmitted screen data. Then, when a touch operation is made on the screen (step S13), information specifying the designated position is transmitted as an operation signal to MFP 100 (step S13-1). The operation signal transmitted here is, for example, an operation signal that specifies the position designated on operation panel 25 by the relative position thereof to the displayed screen. As another example, in a case where the application running on portable terminal 200 has a function of analyzing the screen data from MFP 100, the operation content corresponding to the position designated on operation panel 25 may be specified, and an operation signal indicating the content may be transmitted to MFP 100.

MFP 100 specifies the operation content based on the screen data transmitted to portable terminal 200 and the designated position represented by the received operation signal (step S15). Here, when an additional operation is required to perform the selected function, MFP 100 transmits the screen data for the next operation screen in accordance with the program for executing the selected function of its own. In this case, the operation above in steps S11 to S15 is repeated until the function is executed.

Then, when all the operations necessary to execute the function are specified, MFP 100 executes image processing using the function in accordance with the operations (step S17).

In a case where the program activated in portable terminal 200 has a function of generating a control signal, a control signal for MFP 100 may be generated in accordance with the screen data and the position designated on operation panel 25 and transmitted in place of the operation signal in step S13-1. In this case, MFP 100 executes image processing in accordance with the control signal from portable terminal 200.

Figure 13:
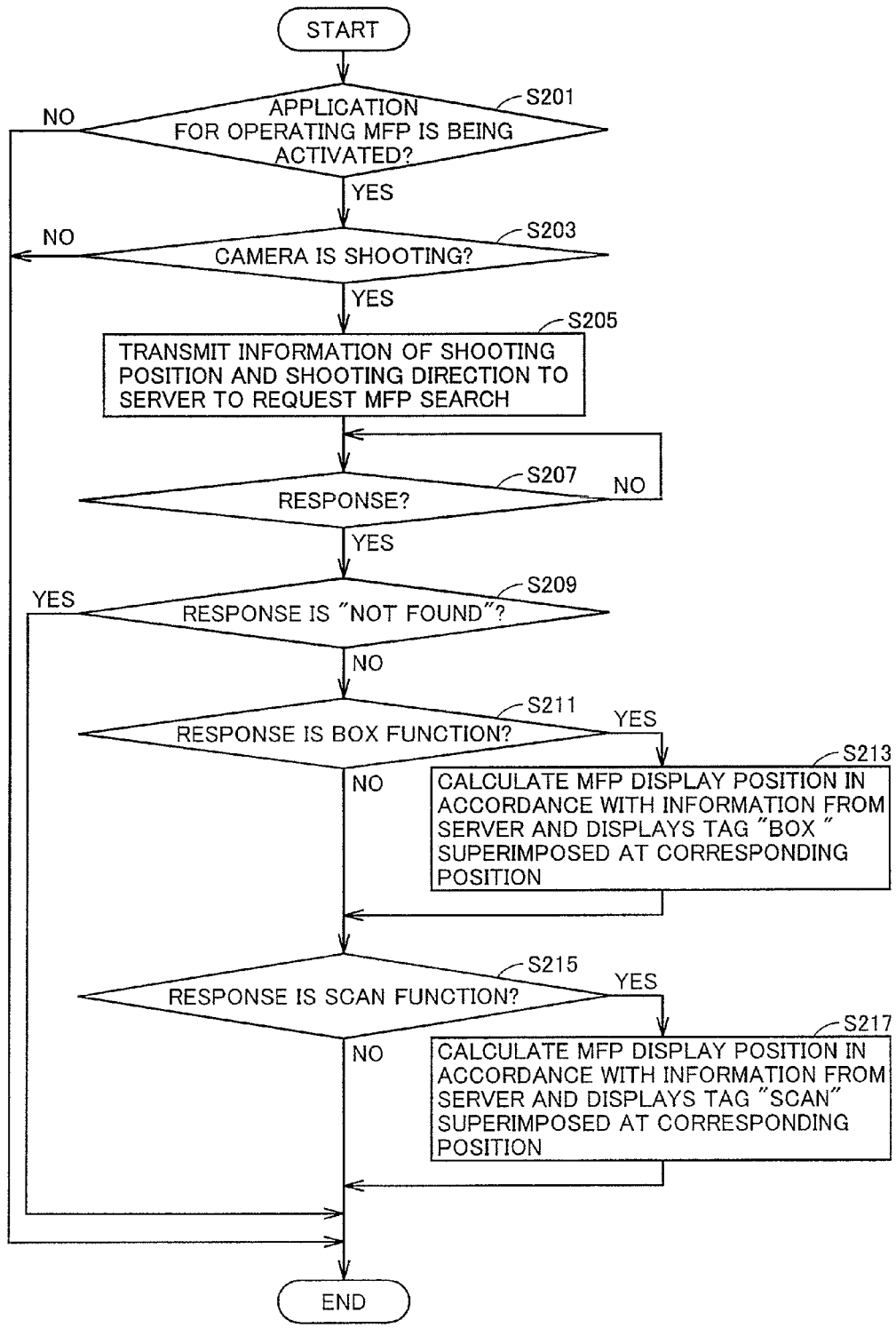
FIG. 13 is a flowchart illustrating an operation in the portable terminal for displaying a tag superimposed on a shot image.
Figure 14:
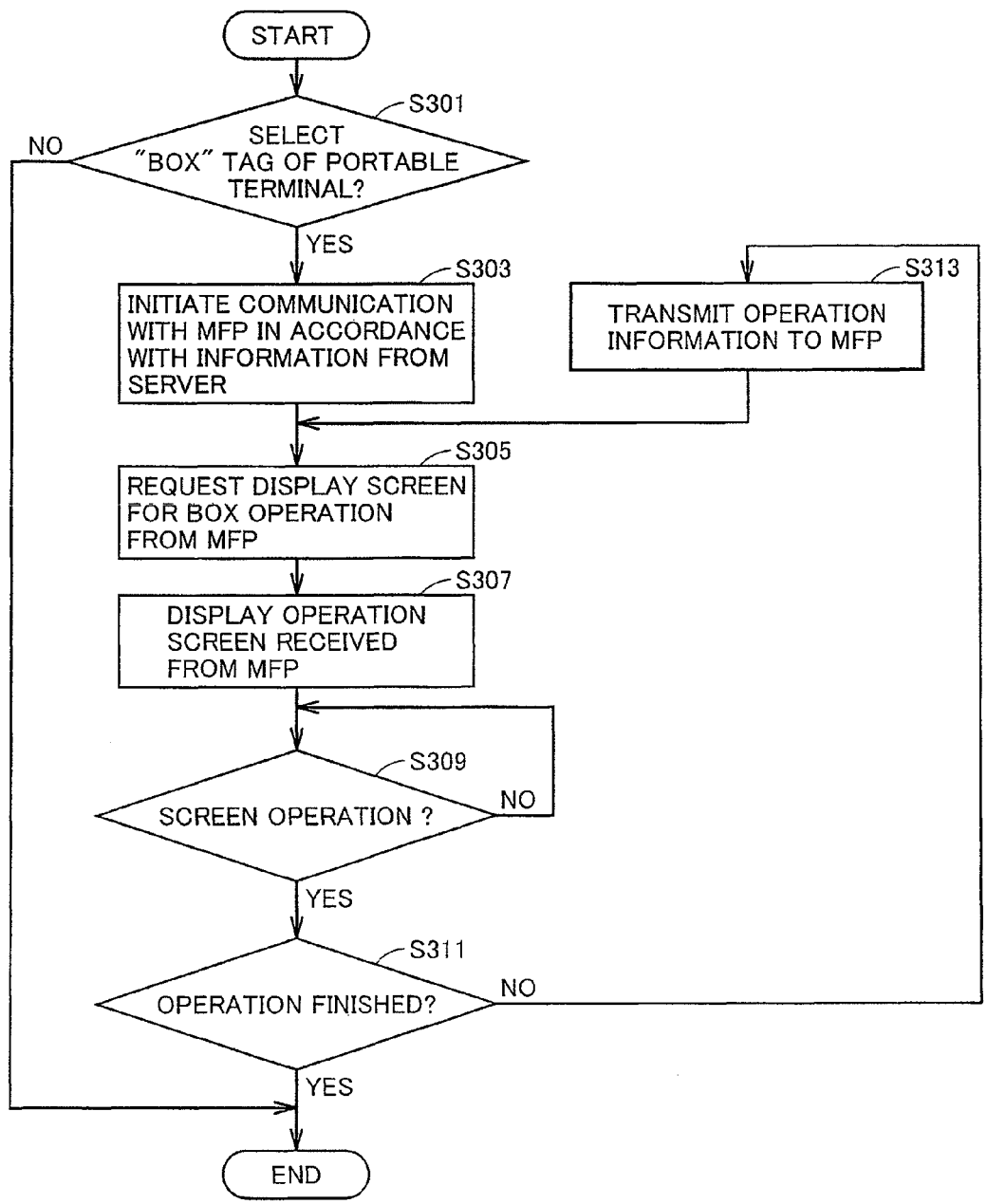
FIG. 14 is a flowchart illustrating an operation in the portable terminal in a case where a box function is selected as a function to be operated.
Figure 15:
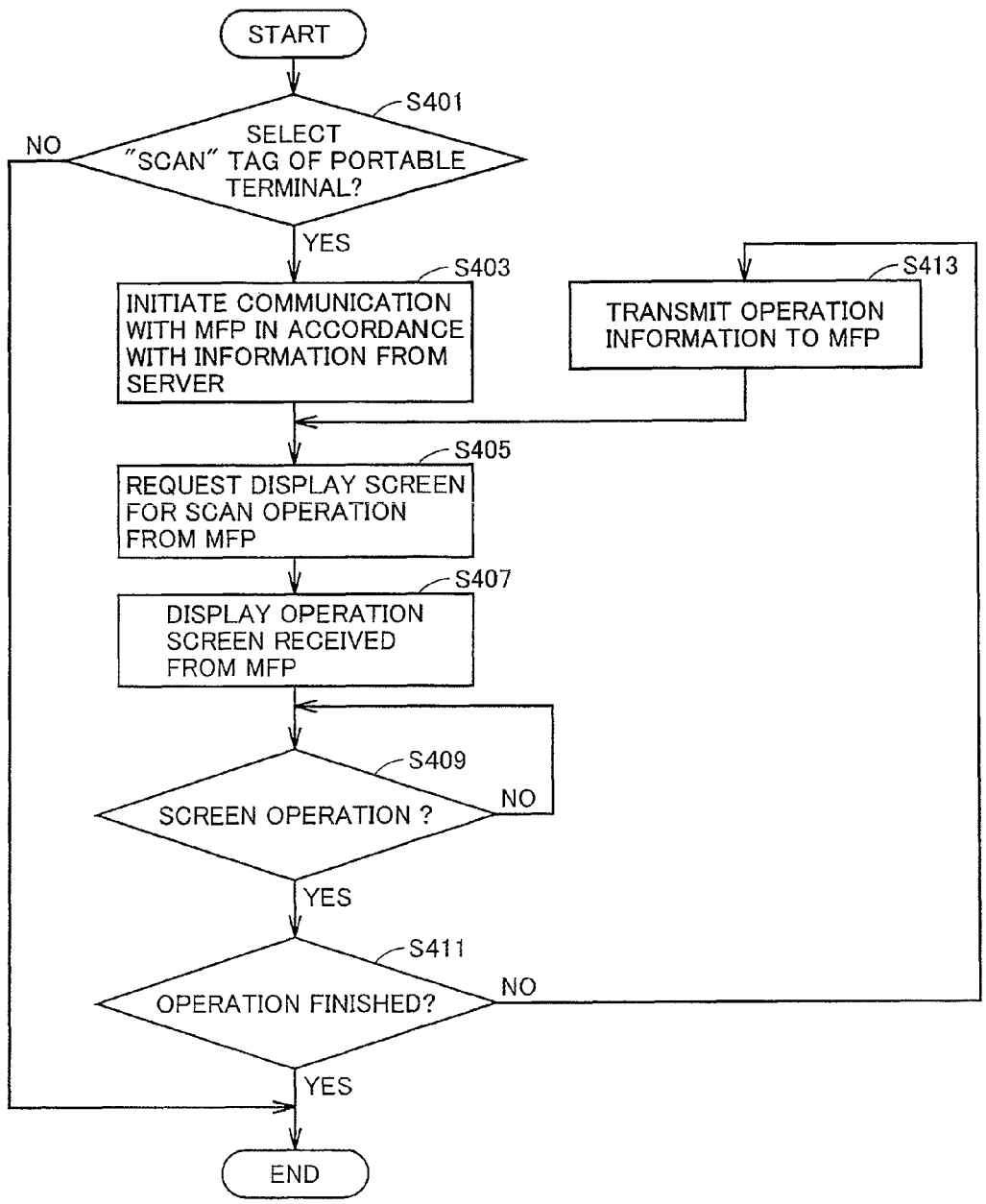
FIG. 15 is a flowchart illustrating an operation in the portable terminal in a case where a scan function is selected as a function to be operated.

The operation in portable terminal 200 will be described in detail below using the flowcharts. FIG. 13, FIG. 14, and FIG. 15 are flowcharts each illustrating an operation in portable terminal 200 performing an operation for operating the MFP. FIG. 13 is a flowchart illustrating an operation for displaying a tag superimposed on a shot image, FIG. 14 is a flowchart illustrating an operation in a case where a box function is selected as a function to be operated, and FIG. 15 is a flowchart illustrating an operation in a case where a scan function is selected as a function to be operated. The operations shown in the flowcharts in FIG. 13, FIG. 14, and FIG. 15 are implemented when CPU 20 reads out a program stored in ROM 21 corresponding to the application for operating the MFP and executes the read program on RAM 22.

Referring to FIG. 13, in a state in which CPU 20 is executing the application for operating the MFP (YES in step S201), and if camera 26 is shooting a photo (YES in step S203), then in step S205, CPU 20 transmits information representing a shooting position and a shooting direction to server 300 and requests transmission of the MFP information of the corresponding MFP.

When a response is received from server 300 (YES in step S207), and when the response is the MFP information (NO in step S209), CPU 20 executes a process for combining tags for selecting the functions specified by the functional information of the MFP information with the image data obtained by shooting, and displaying the combined image.

Specifically, when the functional information shows that the box function is available (YES in step S211), in step S213, CPU 20 calculates the MFP display position in the image data obtained by shooting based on the positional information of the MFP included in the MFP information, and displays a tag for designating start of the operation for the box function so as to be combined at the calculated position or in the vicinity thereof. In the example of the screen in FIG. 2 (2), image data of the tag labeled with "BOX" is stored beforehand, and screen data is generated by combining the image data at the calculated position and is displayed on operation panel 25.

When the functional information shows that the scan function is available (YES in step S215), in step S217, CPU 20 calculates the MFP display position in the image data obtained by shooting based on the positional information of the MFP included in the MFP information, and displays a tag for designating start of the operations for the scan function so as to be combined in the calculated position or in the vicinity thereof. In the example of the screen in FIG. 2 (2), image data of the tag labeled with "scan" is stored beforehand, and image data is generated by combining the image data at the calculated position and is displayed on operation panel 25.

Next, referring to FIG. 14, when the tag representing the box function is selected from the displayed tags (YES in step S301), in step S303, CPU 20 reads out the Bluetooth® address of MFP 100 from the communication information of the MFP information and initiates communication using Bluetooth® with MFP 100. Then, in step S305, the screen data for operating the process by the box function is transmitted to MFP 100.

Upon receiving the corresponding screen data from MFP 100, in step S307, CPU 20 allows operation panel 25 to display an operation screen based on the image data. Upon accepting the operation based on the operation screen, that is, the touch operation on the operation screen (YES in step S309 and NO in step S311), in step S313, CPU 20 transmits a signal specifying the designated position on the operation screen as an operation signal to MFP 100.

The operation thereafter returns to step S305 described above, and the following operation is repeated until the end of operation (YES in step S311). More specifically, a signal specifying the designated position on the operation screen is transmitted as an operation signal to MFP 100 every time a touch operation on the operation screen is accepted, and the next screen data is then transmitted from MFP 100. Accordingly, the operation screens for inputting operations in the box function appear one after another, as depicted in FIG. 2 (3) (4), so that the operations necessary for the process by the box function are accepted on operation panel 25 of portable terminal 200.

When the tag representing the scan function is selected from the displayed tags, CPU 20 also performs an operation similar to the operation illustrated in FIG. 14. Specifically, referring to FIG. 15, when the tag representing the scan function is selected from the displayed tags (YES in step S401), in step S403, CPU 20 reads out the Bluetooth® address of MFP 100 from the communication information of the MFP information and initiates communication using Bluetooth® with MFP 100. Then, in step S405, screen data for operating the process by the scan function is transmitted to MFP 100.

Upon receiving the corresponding screen data from MFP 100, in step S407, CPU 20 allows operation panel 25 to display an operation screen based on the image data. Upon accepting an operation based on the operation screen, that is, a touch operation on the operation screen (YES in step S409 and NO in step S411), in step S413, CPU 20 transmits a signal specifying the designated position on the operation screen as an operation signal to MFP 100.

The operation thereafter returns to step S405 described above, and the following operation is repeated until the end of operation (YES in step S411). More specifically, a signal specifying the designated position on the operation screen is transmitted as an operation signal to MFP 100 every time a touch operation on the operation screen is accepted, and the next screen data is then transmitted from MFP 100. Accordingly, the operation screens for inputting the operations in the box function appear one after another in a similar manner as in FIG. 2 (3) (4), so that the operations necessary for the process by the scan function are accepted on operation panel 25 of portable terminal 200.

Effects of Embodiment

Through the operation as described above in the image processing system according to the present embodiment, MFP 100 can be operated using portable terminal 200 as described in the overall operations.

In the foregoing example, the box function and the scan function are illustrated as examples of functions of MFP 100. As the recent MFPs have been more sophisticated, even more functions are installed and available. In such a case, many options for selecting a function to be operated from those functions as well as options for operation in those functions are displayed on the operation screens appearing on operation panel 15 of MFP 100. Therefore, such operation screens are difficult to operate for the users unfamiliar with them. Moreover, since the functions installed in MFPs and the available functions vary among MFPs, the users unfamiliar with them may be unable to promptly determine whether the desired function is available in the MFP to be operated.

In such a case, in the image processing system according to the present embodiment, the user can activate the dedicated application in portable terminal 200 familiar to them and take a picture of the MFP, so that the functions available in the MFP are displayed as tags. Then, when the user selects one from those tags, the operation screen for the function to be operated appears on operation panel 25 of portable terminal 200. The user can operate MFP 100 through operation input on the screen.

Accordingly, the users can recognize the available functions at a glance and, in addition, can operate the functions easily. In addition, even when MFP 100 is located at a distance from the users, the users do not have to move there and can operate MFP 100 with portable terminal 200 they carry.

Modified Embodiment

In MFP 100, user authentication may be performed in using a function. Such a case will now be described as a modified embodiment.

Figure 16:
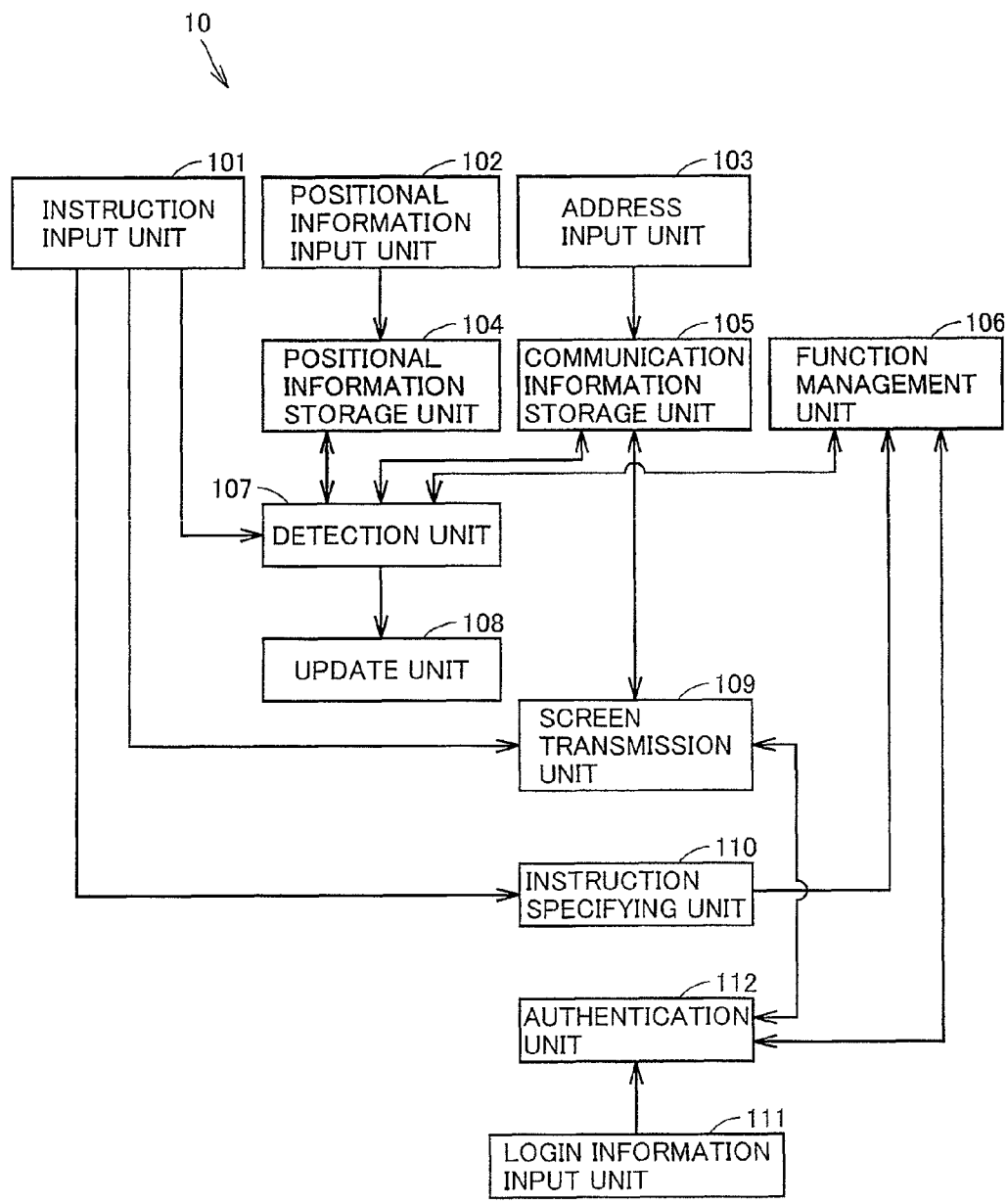
FIG. 16 is a block diagram showing a specific example of a functional configuration of the MFP according to a modified embodiment.

FIG. 16 is a block diagram showing a specific example of a functional configuration of MFP 100 according to the modified embodiment. Each function shown in FIG. 16 is also a function mainly formed in CPU 10 when CPU 10 reads out a program stored in ROM 11 and executes the program on RAM 12. However, at least part of the functions may be formed by the hardware configuration shown in FIG. 3.

Referring to FIG. 16, as functions for implementing the operation described above, MFP 100 according to the modified embodiment further includes, in addition to the functions shown in FIG. 7, a login information input unit 111 for accepting input of login information and an authentication unit 112 for performing user authentication.

In the modified embodiment, function management unit 106 stores the installed and available functions and stores information of users permitted to use for each function, or user information that is information of the functions permitted to be used for each user.

Figure 17:
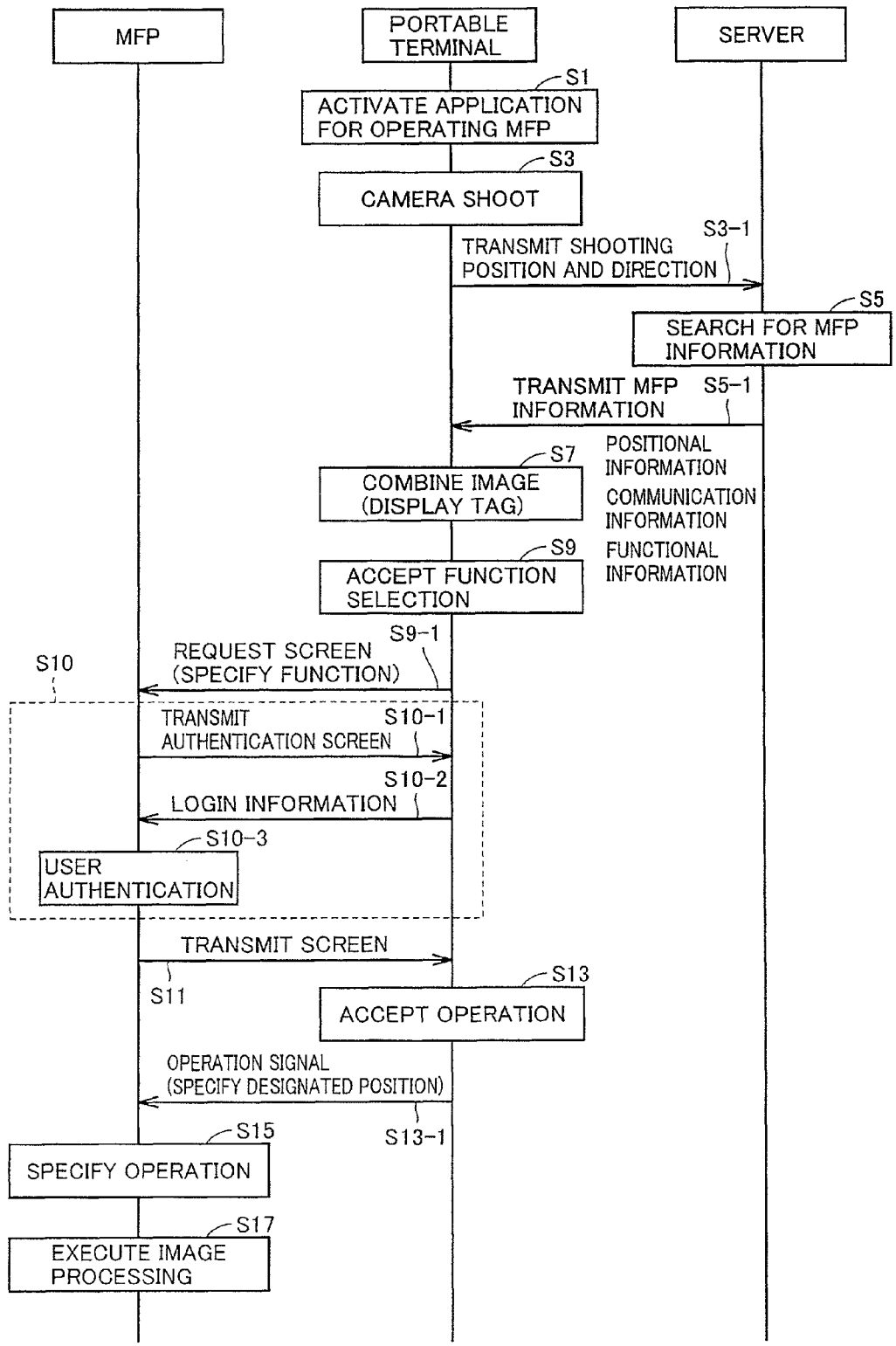
FIG. 17 is a sequence diagram illustrating a flow of an operation for operating the MFP in the image processing system according to the modified embodiment.

FIG. 17 is a sequence diagram illustrating a flow of an operation for operating the MFP in the image processing system according to the modified embodiment. The flow of the operation illustrated in FIG. 17 differs from the flow of the operation shown in FIG. 12 in that an operation for user authentication as illustrated in step S10 is additionally performed.

Specifically, in the image processing system according to the modified embodiment, a function is selected at portable terminal 200 in step S9, and a request for a screen is given to MFP 100 together with the information that specifies the function corresponding to the tag selected in step S9-1. Then, MFP 100 determines whether the selected function requires user authentication. Then, if user authentication is required, an operation for user authentication in step S10 is performed.

More specifically, if user authentication is required, in step S10-1, MFP 100 transmits screen data for inputting login information for use in user authentication, in place of the requested screen data, to portable terminal 200. When input of login information is accepted in accordance with the screen in step S10-2, then in step S10-3, MFP 100 refers to the stored user information and determines whether to permit the use of the selected function. If it is determined that the use is permitted, that is, if user authentication is successful for the selected function, the requested screen data is transmitted to portable terminal 200 in step S11.

In this manner, a function that requires user authentication, for example, such as a box function, can also be provided with security and with enhanced operability.

Although input of login information is accepted in this modified embodiment, MFP 100 may store the correspondence between the Bluetooth® address of portable terminal 200 and user information and may perform user authentication based on the address when portable terminal 200 requests screen data from MFP 100 in step S9-1. Alternatively, in place of user authentication in this manner, authentication may be performed using a passkey (PIN code) in the communication using Bluetooth® between MFP 100 and portable terminal 200.

The present invention also provides a program for allowing MFP 100 as described above to execute the foregoing operation, a program for allowing portable terminal 200 to execute the foregoing operation, and a program for allowing server 300 to execute the foregoing operation. Such programs may be stored in a computer-readable recording medium accompanying a computer, such as a flexible disk, a CD-ROM (Compact Disk-Read Only Memory), a ROM (Read Only Memory), a RAM (Random Access Memory), and a memory card, and be provided as a program product. Alternatively, the programs may be stored in a recording medium such as a hard disk contained in a computer. The programs may be downloaded via a network.

The program in accordance with the present invention may allow the process to be executed by invoking necessary modules, among program modules provided as a part of Operating System (OS) of a computer, in a prescribed sequence at a prescribed timing. In this case, the modules are not included in the program itself and the process is executed in cooperation with OS. The program that does not include such modules may also be included in the program in accordance with the present invention.

Furthermore, the program in accordance with the present invention may be embedded in a part of another program. In this case, the modules included in another program are not included in the program itself, and the process is executed in cooperation with another program. Such a program embedded in another program may also be included in the program in accordance with the present invention.

The provided program product is installed in a program storage unit such as a hard disk for execution. It is noted that the program product includes the program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising:
   a portable terminal;
   an image processing apparatus including a controller; and
   an information processing apparatus,
   said portable terminal including:
      a shooting unit,
      an obtaining unit that obtains positional information and orientation information of said portable terminal,
      a display unit, and
      an input unit that inputs an instruction on an operation screen displayed on said display unit,
   said information processing apparatus including:
      a storage unit that stores, as information about an image processing apparatus, positional information of said image processing apparatus, functional information indicating an installed available function, and communication information for communicating with said portable terminal,
   wherein
   said portable terminal transmits positional information and orientation information at a time of shooting by said shooting unit to said information processing apparatus,
   said information processing apparatus detects an image processing apparatus included in an image shot by said shooting unit of said portable terminal, based on the positional information and orientation information at a time of shooting at said portable terminal, and transmits information about said detected image processing apparatus to said portable terminal,
   the portable terminal receives the information about the image processing apparatus transmitted by the information processing apparatus, and
   said portable terminal further including a controller that combines said image shot by said shooting unit with an option for selecting an available function in said image processing apparatus and displaying the combined image on said display unit based on the received information about the image processing apparatus, and that accepts selection of said function by said input unit.

2. The image processing system according to claim 1, wherein
   when accepting selection of said function, said controller of said portable terminal transmits a signal specifying said function to said image processing apparatus,
   said controller of said image processing apparatus transmits information for displaying a screen for operating said function to said portable terminal, based on said signal specifying said function, and
   said controller of said portable terminal allows said display unit to display a screen for operating said function based on said information.

3. The image processing system according to claim 2, wherein
   said image processing apparatus further includes a display unit that displays an operation screen for accepting operation input, and
   said controller of said image processing apparatus transmits information for an operation screen of said function to be displayed on said display unit of said image processing apparatus, to said portable terminal, based on said signal specifying said function.

4. The image processing system according to claim 1, wherein
   when accepting an instruction on said operation screen by said input unit, said controller of said portable terminal transmits a signal representing said instruction to said image processing apparatus, and
   said controller of said image processing apparatus executes image processing corresponding to said signal.

5. The image processing system according to claim 1,
   said image processing apparatus further including:
      a storage unit that stores, as information about said image processing apparatus, positional information of said image processing apparatus, functional information indicating an available function installed in said image processing apparatus, and communication information for communicating with said portable terminal,
      a first communication unit that communicates with said information processing apparatus, and
      a second communication unit that communicates with said portable terminal,
   wherein when detecting a change of said information about said image processing apparatus, said controller of said image processing apparatus executes a process of transmitting said information about said image processing apparatus to said information processing apparatus.

6. A control method for an image processing system including a portable terminal having a shooting unit and a display unit, an image processing apparatus, and an information processing apparatus,
   wherein said information processing apparatus stores, as information about said image processing apparatus, positional information of said image processing apparatus, functional information indicating an installed available function, and communication information for communicating with said portable terminal,
   said control method comprising the steps of:
      causing said portable terminal to transmit positional information and orientation information at a time of shooting by said shooting unit of said portable terminal to said information processing apparatus;
      causing said information processing apparatus to extract an image processing apparatus included in an image shot by said shooting unit of said portable terminal, based on said positional information and orientation information transmitted from said portable terminal and the positional information included in said information about said image processing apparatus, and to transmit information about said extracted image processing apparatus to said portable terminal;

causing said portable terminal to receive the information about the image processing apparatus transmitted by the information processing apparatus, and to combine said image shot by said shooting unit with an option for selecting an available function in said image processing apparatus and display the combined image on said display unit, based on said information about said image processing apparatus transmitted from said information processing apparatus;

when selection of said function is accepted, causing said portable terminal to display a screen for operating said selected function on said display unit;

when an instruction on said screen for operating is accepted, causing said portable terminal to transmit a signal representing said instruction to said image processing apparatus; and causing said image processing apparatus to execute corresponding image processing based on said signal.

7. The control method according to claim 6, further comprising the steps of:

when selection of said function is accepted, causing said portable terminal to transmit a signal specifying said selected function to said image processing apparatus; and causing said image processing apparatus to transmit information for displaying a screen for operating said function to said portable terminal, based on said signal specifying said function that is transmitted from said portable terminal, wherein in said step of causing said portable terminal to display a screen for operating said selected function on said display unit, said portable terminal displays said screen for operating based on said information for displaying a screen for operating said function that is transmitted from said image processing apparatus.

8. A portable terminal comprising:
a shooting unit;
an obtaining unit that obtains positional information and orientation information of said portable terminal;
a display unit;
an input unit that inputs an instruction on an operation screen displayed on said display unit; and
a controller,
wherein said controller executes:
a process of transmitting positional information and orientation information at a time of shooting by said shooting unit to an information processing apparatus,
a process of receiving information about the image processing apparatus from the information processing apparatus included in an image shot by the shooting unit and detected based on the positional information and orientation information,
a process of combining an image shot by said shooting unit with an option for selecting an available function in an image processing apparatus, and displaying the combined image on said display unit, based on the information about said image processing apparatus that is received from said information processing apparatus, a process of accepting selection of said function by said input unit and then displaying a screen for operating said selected function on said display unit, and a process of accepting an instruction on said screen for operating by said input unit and then transmitting a signal representing said instruction to said image processing apparatus.

9. The portable terminal according to claim 8, wherein when accepting selection of said function by said input unit, said controller transmits a signal specifying said selected function to said image processing apparatus and allows said display unit to display said screen for operating based on information for displaying said screen for operating the function that is received from said image processing apparatus in response to said signal.

10. An information processing apparatus comprising:
a storage unit that stores, as information about an image processing apparatus, positional information of said image processing apparatus, functional information indicating an installed available function, and communication information for communicating with a portable terminal;
a communication unit that communicates with said portable terminal; and
a controller,
wherein when receiving, from said portable terminal, positional information and orientation information at a time of shooting by a shooting unit of said portable terminal, said controller executes a process of extracting an image processing apparatus included in an image shot by said shooting unit of said portable terminal, based on said positional information and orientation information and the positional information included in said information about said image processing apparatus, and transmitting information about said extracted image processing apparatus to said portable terminal.

11. A non-transitory computer-readable recording medium encoded with a control program for causing a portable terminal including a shooting unit and a display unit to execute processing, said control program causing said portable terminal to execute the steps of:

transmitting positional information and orientation information at a time of shooting by said shooting unit to an information processing apparatus;

receiving information about the image processing apparatus from the information processing apparatus included in an image shot by the shooting unit and detected based on the positional information and orientation information, combining an image shot by said shooting unit with an option for selecting an available function in said image processing apparatus and displaying the combined image on said display unit, based on information about an image processing apparatus that is received from said information processing apparatus;

accepting selection of said function by said input unit and displaying a screen for operating said selected function on said display unit;

accepting an instruction on said screen for operating by said input unit and then transmitting a signal representing said instruction to said image processing apparatus;

when selection of said function is accepted, displaying a screen for operating said selected function on said display unit; and when an instruction on said screen for operating is accepted, transmitting a signal representing said instruction to said image processing apparatus.

12. The non-transitory computer-readable recording medium according to claim 11, wherein said step of displaying a screen for operating said selected function on said display unit includes the steps of:

when selection of said function is accepted, transmitting a signal specifying said function to said image processing apparatus; and receiving information for displaying a screen for operating said function from said image processing apparatus in response to said signal, wherein said screen for operating is displayed on said display unit based on said information for displaying a screen for operating said function from said image processing apparatus.

13. A non-transitory computer-readable recording medium encoded with a control program for causing an information processing apparatus to execute processing, wherein said information processing apparatus stores, as information about an image processing apparatus, positional information of said image processing apparatus, functional information indicating an installed available function, and communication information for communicating with a portable terminal, said control program causing said information processing apparatus to execute the steps of:

receiving, from said portable terminal, positional information and orientation information at a time of shooting by a shooting unit of said portable terminal;

extracting an image processing apparatus included in an image shot by said shooting unit of said portable terminal, based on said positional information and orientation information and the positional information included in said information about an image processing apparatus; and transmitting information about said extracted image processing apparatus to said portable terminal.

* * * * *